United States Patent
Griffin et al.

(10) Patent No.: US 7,924,143 B2
(45) Date of Patent: Apr. 12, 2011

(54) SYSTEM AND METHOD FOR PROVIDING TACTILE FEEDBACK TO A USER OF AN ELECTRONIC DEVICE

(75) Inventors: Jason Griffin, Kitchener (CA); Steven Fyke, Waterloo (CA); Kevin Orr, Elmira (CA)

(73) Assignee: Research In Motion Limited, Waterloo, Ontario (CA)

( * ) Notice: Subject to any disclaimer, the term of this patent is extended or adjusted under 35 U.S.C. 154(b) by 381 days.

(21) Appl. No.: 12/135,376

(22) Filed: Jun. 9, 2008

(65) Prior Publication Data
US 2009/0303022 A1 Dec. 10, 2009

(51) Int. Cl.
- *H04B 3/36* (2006.01)
- *G08B 6/00* (2006.01)
- *G08B 21/00* (2006.01)
- *G06F 3/043* (2006.01)

(52) U.S. Cl. .................................. 340/407.2; 345/177
(58) Field of Classification Search ............... 340/407.1, 340/407.2; 345/156–184
See application file for complete search history.

(56) References Cited

U.S. PATENT DOCUMENTS

| | | | |
|---|---|---|---|
| 4,885,565 A | 12/1989 | Embach | |
| 5,880,712 A | 3/1999 | Goldman | |
| 5,887,995 A | 3/1999 | Holehan | |
| 5,942,733 A | 8/1999 | Allen et al. | |
| 5,988,902 A | 11/1999 | Holehan | |
| 6,073,036 A | 6/2000 | Heikkinen et al. | |
| 6,232,960 B1 | 5/2001 | Goldman | |
| 6,384,743 B1* | 5/2002 | Vanderheiden | 341/21 |
| 6,411,287 B1 | 6/2002 | Scharff et al. | |
| 6,473,069 B1 | 10/2002 | Gerpheide | |
| 6,492,978 B1 | 12/2002 | Selig et al. | |
| 6,593,916 B1 | 7/2003 | Aroyan | |
| 6,657,614 B1* | 12/2003 | Ito et al. | 345/168 |
| 6,819,990 B2 | 11/2004 | Ichinose | |
| 7,012,593 B2* | 3/2006 | Yoon et al. | 345/156 |

(Continued)

FOREIGN PATENT DOCUMENTS

EP 1758013 A1 2/2007

(Continued)

OTHER PUBLICATIONS

Caitlin, Adam. Sony Erisson W950i: Stylish 3G Touchscreen Phone. http://www.easyarticles.com/article-88069.htm. Oct. 22, 2007.

*Primary Examiner* — Jennifer Mehmood
(74) *Attorney, Agent, or Firm* — Geoffrey deKleine; Borden Ladner Gervais LLP

(57) ABSTRACT

A system for providing tactile feedback for an input device in an electronic device is provided. The system comprises: an input device having a first input region for receiving a user action from the user; a surface associated with the input device and covering at least a part of the first input region; an input signal generator associated with the input device; and a physical feature associated with the input region. The physical feature is located on the surface, provides a second input region for receiving the user action and provides a tactile feedback sense to the user when the user contacts the second region. The input signal generator generates a first input signal when the user touches the first input region while not touching second input region and generates a second input signal when the user touches simultaneously the first and the second input regions.

17 Claims, 9 Drawing Sheets

U.S. PATENT DOCUMENTS

| | | |
|---|---|---|
| 7,151,530 B2 * | 12/2006 | Roeber et al. ............... 345/168 |
| 7,170,496 B2 | 1/2007 | Middleton |
| 7,339,581 B2 * | 3/2008 | Katayose ..................... 345/173 |
| 7,616,192 B2 * | 11/2009 | Schroeder ..................... 345/173 |
| 7,768,504 B2 * | 8/2010 | Rosenberg et al. ........... 345/173 |
| 2003/0197687 A1 | 10/2003 | Shetter |
| 2005/0035951 A1 * | 2/2005 | Bjorkengren ................. 345/173 |
| 2005/0195562 A1 | 9/2005 | Itskov et al. |
| 2006/0284523 A1 | 12/2006 | Chen et al. |
| 2007/0185631 A1 | 8/2007 | Yeh et al. |
| 2007/0236474 A1 * | 10/2007 | Ramstein ..................... 345/173 |
| 2008/0297475 A1 * | 12/2008 | Woolf et al. .................. 345/163 |
| 2009/0167704 A1 * | 7/2009 | Terlizzi et al. ................ 345/173 |

FOREIGN PATENT DOCUMENTS

| | | |
|---|---|---|
| WO | WO 2007/037809 A1 | 4/2007 |
| WO | WO 2008/025370 A1 | 3/2008 |

* cited by examiner

SYSTEM AND METHOD FOR PROVIDING TACTILE FEEDBACK TO A USER OF AN ELECTRONIC DEVICE

FIELD OF DISCLOSURE

The disclosure herein describes a system and method for providing feedback to a user of an electronic device. In particular, the disclosure relates to providing a tactile feedback to a user action (such as applying a finger) to an input device, such as a key or touchpad, in an electronic device.

BACKGROUND

Current computing and communication devices perform a variety of functions to enable mobile users to stay current with information and communications, such as e-mail, corporate data and organizer information while they are away from their desks. They often have a variety of input devices, such as keypads, dials, thumbwheels, trackballs, touch screens and the like. Some input devices, such as a touchpad, have smooth surfaces having defined multiple input regions. It may be difficult for a user to scan a touchpad and distinguish between regions on the smooth surface of the touchpad.

BRIEF DESCRIPTION OF THE DRAWINGS

The disclosure and related embodiments will now be described, by way of example only, with reference to the accompanying drawings, in which.

DETAILED DESCRIPTION OF AN EMBODIMENT

Figure 1:
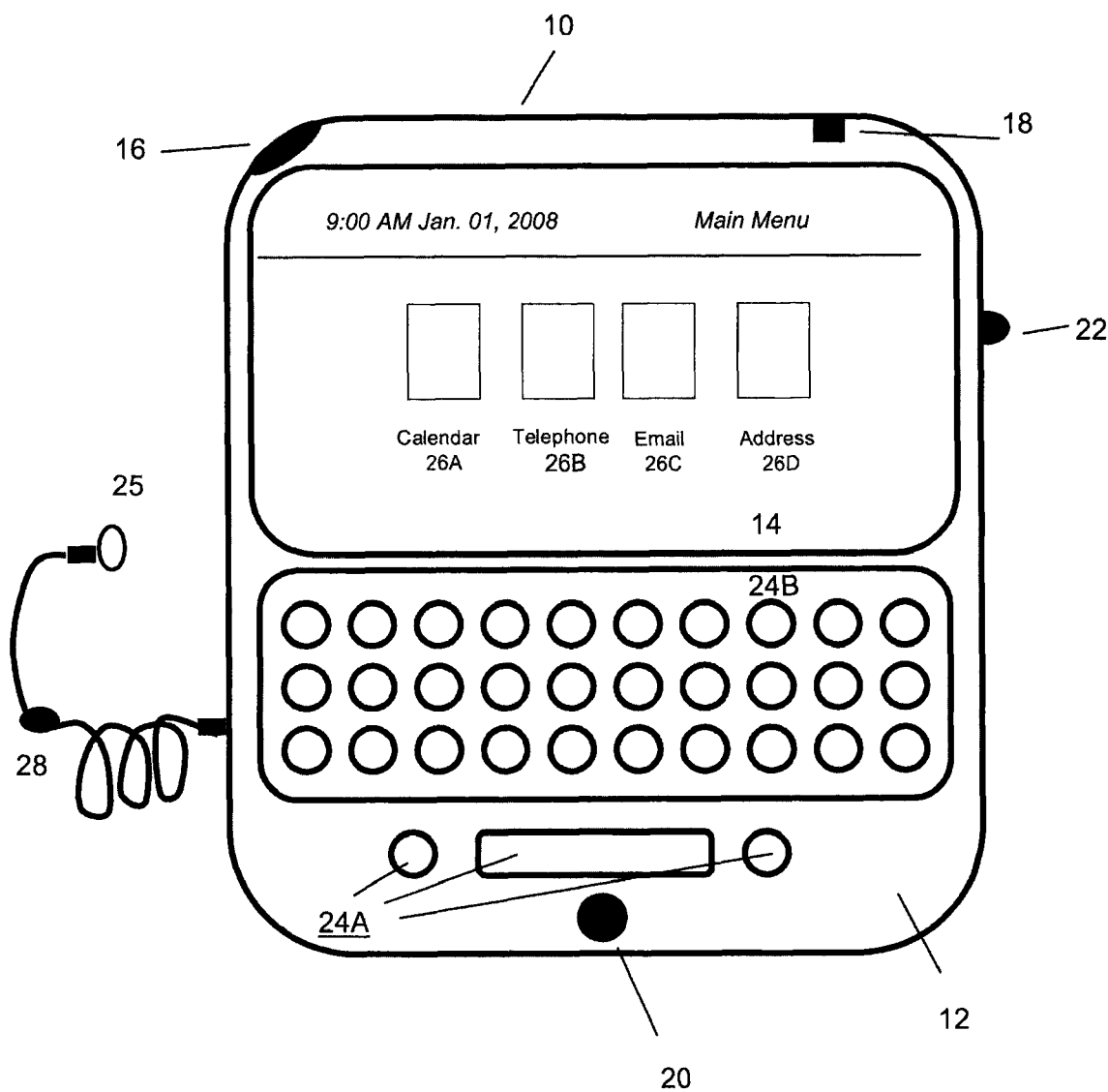
FIG. 1 is a schematic representation of an electronic device having an input device, shown as a touchpad, in accordance with an embodiment.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

In a first aspect, a system for providing tactile feedback to a user of an electronic device is provided. The system comprises: an input device in the electronic device having a first input region for receiving a user action from the user; a surface associated with the input device and covering at least a part of the first input region; an input signal generator associated with the input device; and a physical feature associated with the input region. The physical feature is located on the surface, provides a second input region for receiving the user action and provides a tactile feedback sense to the user when the user contacts the second region. In the system, the input signal generator generates a first input signal when the user action comprises the user touching the first input region while not touching second input region. The input signal generator generates a second input signal when the user action is to touch simultaneously the first input region and the second input region.

In the system, the input signal generator may generate a third input signal when the user action is to touch the second input region and simultaneously not touch the first input region.

In the system, the input device may be a touchpad generating voltage signals for the input signal generator.

In the system, the user action may be a scan of a finger across the touchpad and over the nodule, where the user action generates the first, second and third input signals within a preset time range.

In the system, the first, second and third input signals may be evaluated for their location, time and order to determine whether they match a predetermined input action.

In the system, the physical feature may be a nodule located on the surface.

In the system, the surface may have a well around the first input region and the physical feature may be a nodule located in the well.

In the system, the second signal may be affected by an air gap existing between the first input region and the second input region when the user touches simultaneously the surface and the second input region.

In the system, the second signal may vary on a size of the air gap, an area of first input region contacted during the user action and an area of the second input region contacted by during the user action.

In the system, the second signal may be reduced in magnitude as the air gap increases in size.

In the system, the second signal may be increased in magnitude as the air gap increases in size.

In another aspect, a method of providing tactile feedback to a user of an electronic device having an input device is provided. The input device has a first input region for receiving a user action from the user, a surface associated with the input device that covers at least a part of the first input region. An input signal generator is associated with the input device. A physical feature is associated with the input region, located on the surface, which provides a second input region for receiving the user action and provides a tactile feedback to the user when the user contacts the second region. The method comprises: generating by the input signal generator a first input signal when the user action comprises the user touching the first input region while not touching the second input region; and generating by the input signal generator a second input signal when the user action comprises the user touching simultaneously the first input region and the second input region.

Briefly, an embodiment provides tactile feedback to a user when he activates, or is about to activate, an input device in the electronic device. In an embodiment, the input device has a set of regions that are defined to receive a user action (namely an action imparted by a user on the input device). Depending on what region(s) are affected by the user action, a feedback may be provided. Further exemplary details are provided on a user action, input regions and senses for an embodiment.

For an embodiment, a user action may be any predetermined physical action that a user may impart on an input device. A user action may be to scan, hover and/or activate the input device with a body part, such as a finger. More particularly, user actions may include: pressing on the input device at one or more regions around the device; lightly sweeping a body part over at least part of the input device; holding a body part on or slightly above a region around the input device, etc.

The input device may have, or may be associated with, two or more regions that are used to define sensing regions for user actions relating to the input device. When a user action is imparted on those regions, a feedback is provided. A first region may be defined around the input device to provide an activation region for the input device. For example, on a touchpad, the first region may be a predefined area in the touchpad surface that is associated with a predefined key; on keyboard, the first input region may be the key itself. A second region may be defined as a physical feature on or around the input device to provide a feedback sense to the use. For example, on a touchpad, the second region may be a feature such as a bump, ridge, depression, well, line, score mark, or other distinguishing physical feature on the surface of the touchpad. The physical feature may also be a change in texture, shape and/or material that is present in the second region which differs from material or textures in the first region. The physical features can be combined.

Tactile feedback is a feedback (sense) that is generated, felt and/or detected when a user action is asserted upon one or more of the above-noted regions of the input device. The feedback may be passive, active or a combination of the two. Passive feedback may be a tactile sense provided by a physical feature on one or more of the regions of an input device. An active feedback may be a physical movement, a generated light and/or an audible signal or any other signal that is triggered to be generated by the electronic device upon detection of the user action. An active feedback may be generated by components in the electronic device (e.g. its buzzer, transducer, display, speaker, ancillary lights).

Combining elements of the input device, its regions, the senses and the user action, different senses may be provided for different user actions that are applied to one or more of the regions. For example, consider a touchpad having a flat surface and a first region defining a key, where there is a nodule on the surface defining a second region, where the nodule is placed in the middle of the first region defining the key. A first feedback (sense) may be provided when the user places his finger (one type of user action) on the touchpad in the key region (the first region) when he is not touching the nodule (namely the second region). An input signal generator may be associated with the touchpad to receive the signals generated by the touchpad from sensing the user's finger. The input signal generator may then process the signals from the touchpad and then generate a first signal which is meant to be used by other modules in the device to generate the first sense. As such, the first signal may be provided to other modules in the device to process certain actions (e.g. to update the location of a cursor on the display as the user tracks his finger across the touchpad, to generate a feedback buzz signal for activating the key in the touchpad, etc.).

In the above situation, a second feedback (sense) may be generated when the user moves his finger such that the finger contact the touchpad in the key area and nodule simultaneously. This user action would represent contact with the first and second regions of the input device. When this user action is detected the input signal generator may generate a second signal. The surface of the touchpad itself may or may not be deflected if the user also presses on the nodule. Any physical deformations would be dependent on the relative dimensions of the feature and elements surrounding the touchpad.

Next, a third feedback (sense) may be generated when the user moves his finger to touch only the nodule and not the surface of the touchpad. This user action would represent contact with only the second region of the input device. When this user action is detected, a third feedback may be provided. The third feedback may simply be a passive feedback, provided by the texture of the nodule or the realization by the user that the finger is no longer touching the surface of the touchpad. However, additionally or alternatively, a third signal may be generated by the input signal generator, if a signal generated by the touchpad during this time can be analyzed by the input signal generator to generate a third signal. The signal generated by the touchpad may be the loss of the previously detected contact on the touchpad.

Other user actions may be provided when the user has his finger on the nodule alone, then moves it to touch the nodule and the touchpad simultaneously and then moves it further to touch the touchpad alone. The feedbacks generated may be similar to the three feedback (senses) described above, but may be generated in the reverse order as described above.

Additionally, when a user action matches a predetermined action, another signal may be generated by the device. For example, if a user action is detected as an effort to press on a key, then a further signal may be generated to initiate generation of the key on the display. The signals received at the input device for user action would be compared against a template of input signals from the input device expected when the key is being activated.

The input signal generator analyses signals from the input device and generates one or more input signals based on the analysis. When analyzing signals from the input device, the generator may detect any difference in voltage, frequency, amplitude, current, capacitance and/or resistance between the signals. The output signal may be a voltage or current signal. The output signal may represent a simple change signal (e.g. a positive voltage may indicate an change in one direction of a sense type and a negative voltage may indicate a change in another direction of a sense type). The number of different senses may be determined by the sensitivity granularity desired.

Other signals and senses may be generated for other user actions, such as moving two or more fingers, two hands and/or other parts of a user's body gliding simultaneously across the input device. One user action may be mapped to be equivalent to another user action. For example, one user action of moving two fingers on two separate hands across a touchpad may be mapped to be equivalent as another user action of moving two fingers on one hand across the touchpad. Differences among user actions may be tracked and distinguished by an embodiment using the differing output signals generated by the input device for the different user actions. If two user actions are deemed to be equivalent to each other, then a mapping of input signals can be provided for each other. One exemplary mapping compares one set of input signals generated from one user action against either an idealized template of signals or a second set of input signals generated from a second equivalent user action. For example if a scan of one finger across the touchpad is deemed to be equivalent to a scan of two fingers across the touchpad in the same general direction, then the signals generated for the first scan by the touchpad may be compared against the signals generated for the second scan. A mapping algorithm may be applied to attempt to correlate the two scans against each other.

With some general features of an embodiment described, a description of elements in an embodiment in an electronic device are provided, which is followed by details on specific features of embodiments.

Referring to FIG. 1, an electronic device for receiving electronic communications in accordance with an embodiment of the disclosure is indicated generally at 10. In the present embodiment, electronic device 10 is based on a computing platform having exemplary functionality of an enhanced personal digital assistant such as cellphone, e-mail, photographic and media playing features. It is, however, to be understood that electronic device 10 can be based on construction design and functionality of other electronic devices, such as smart telephones, desktop computers pagers or laptops having telephony equipment. In a present embodiment, electronic device 10 includes a housing 12, a display 14 (which may be a liquid crystal display or LCD), speaker 16, a light emitting diode (LED) indicator 18, a trackball 20, a trackwheel (not shown), an ESC ("escape") key 22, keys 24A, touchpad 24B, a telephone headset comprised of an ear bud 25 and a microphone 28. Trackball 20 and ESC key 22 can be inwardly depressed as a means to provide additional input signals to device 10.

It will be understood that housing 12 can be made from any suitable material as will occur to those of skill in the art and may be suitably formed to house and hold all components of device 10.

Device 10 is operable to conduct wireless telephone calls, using any known wireless phone system such as a Global System for Mobile Communications ("GSM") system, Code Division Multiple Access ("CDMA") system, Cellular Digital Packet Data ("CDPD") system and Time Division Multiple Access ("TDMA") system. Other wireless phone systems can include Bluetooth and the many forms of 802.11 wireless broadband, like 802.11a, 802.11b, 802.11g, etc. that support voice. Other embodiments include Voice over IP ("VoIP") type streaming data communications that can simulate circuit switched phone calls. Ear bud 25 can be used to listen to phone calls and other sound messages and microphone 28 can be used to speak into and input sound messages to device 10.

Various applications are provided on device 10, including email, telephone, calendar and address book applications. A graphical user interface (GUI) providing an interface to allow entries of commands to activate these applications is provided on display 14 through a series of icons 26. Shown are calendar icon 26A, telephone icon 26B, email icon 26C and address book icon 26D. Such applications can be selected and activated using the touchpad 24B and/or the trackball 20. Further detail on selected applications is provided below.

Keys 24A provide one or more distinct, fixed input keys for device 10. Typically, they may include at least part of keys in an alphanumeric character set. Touchpad 24B may be configured to provide an additional set of "keys" (or input areas) to augment keys 24A. The additional set of "keys" in touchpad 24B are diagrammatically represented in FIG. 1 as circles. A value for each key in touchpad 24B may be silk screened on the surface of touchpad 24B or may have a separate feature, such as a key cap, affixed to or otherwise extending therefrom. As such, touchpad 24B can be used to present a virtual key layout on device 10.

Figure 2:
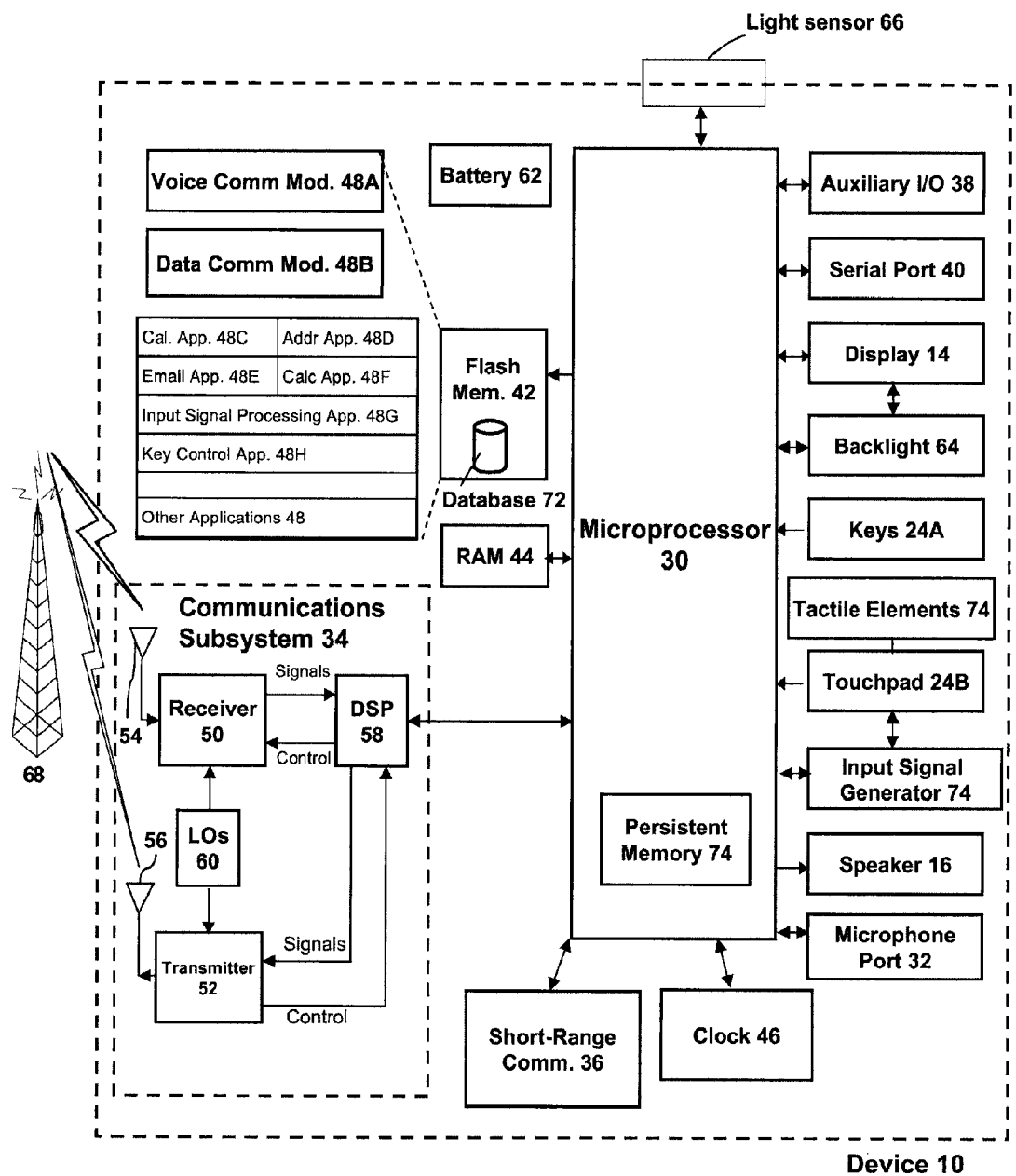
FIG. 2 is a block diagram of internal components including the input device of the device of FIG. 1.

Referring to FIG. 2, functional elements, modules, components and systems of device 10 are provided. The functional elements are generally electronic or electro-mechanical devices mounted within a housing. Many devices are also mounted on an internal printed circuit board (PCB). In particular, microprocessor 30 is provided to control and receive almost all data, transmissions, inputs and outputs related to device 10. Microprocessor 30 is shown schematically as coupled to keys 24A, touchpad 24B, display 14 and other internal devices. Microprocessor 30 controls the operation of display 14, as well as the overall operation of device 10, in response to actuation of keys 24A and keys on touchpad 24B. Exemplary microprocessors for microprocessor 30 include microprocessors in the Data 950 (trade-mark) series, the 6200 series and the PXA900 series, all available at one time from Intel Corporation.

In addition to microprocessor 30, other internal devices of device 10 include: a communication subsystem 34; a short-range communication subsystem 36; touchpad 24B; and display 14; other input/output devices including a set of auxiliary I/O devices through port 38, a serial port 40, a speaker 16 and a microphone port 32 for microphone 28; and memory devices including a flash memory 42 (which provides persistent storage of data) and random access memory (RAM) 44; clock 46 and other device subsystems (not shown). Device 10 may be a two-way radio frequency (RF) communication device having voice and data communication capabilities. In addition, device 10 may have the capability to communicate with other computer systems via the Internet.

Operating system software executed by microprocessor 30 may be stored in a computer readable medium, such as flash memory 42, but may be stored in other types of memory devices (not shown), such as read only memory (ROM) or similar storage element. In addition, system software, specific device applications, or parts thereof, may be temporarily loaded into a volatile storage medium, such as RAM 44. Communication signals received by the mobile device may also be stored to RAM 44.

Microprocessor 30, in addition to its operating system functions, enables execution of software applications on device 10. A set of software applications 48 that control basic device operations, such as voice communication module 48A and data communication module 48B, may be installed on device 10 during manufacture or downloaded thereafter.

Communication functions, including data and voice communications, are performed through communication subsystem 34 and short-range communication subsystem 36. Collectively, subsystem 34 and subsystem 36 provide a signal-level interface for all communication technologies processed by device 10. Various other applications 48 provide the operational controls to further process and log the communications. Communication subsystem 34 includes receiver 50, transmitter 52 and one or more antennas, illustrated as receive antenna 54 and transmit antenna 56. In addition, communication subsystem 34 also includes processing module, such as digital signal processor (DSP) 58 and local oscillators (LOs) 60. The specific design and implementation of communication subsystem 34 is dependent upon the communication network in which device 10 is intended to operate. For example, communication subsystem 34 of device 10 may be designed to work with one or more of a Mobitex (trade-mark) Radio Network ("Mobitex") and the DataTAC (trade-mark) Radio Network ("DataTAC"). Voice-centric technologies for cellular device 10 include Personal Communication Systems (PCS) networks like Global System for Mobile Communications (GSM) and Time Division Multiple Access (TDMA) systems. Certain networks provide multiple systems. For example, dual-mode wireless networks include Code Division Multiple Access (CDMA) networks, General Packet Radio Service (GPRS) networks, and so-called third-generation (3G) networks, such as Enhanced Data rates for Global Evolution (EDGE) and Universal Mobile Telecommunications Systems (UMTS). Other network communication technologies that may be employed include, for example, Ultra Mobile Broadband (UMB), Evolution-Data Optimized (EV-DO), and High Speed Packet Access (HSPA), etc.

In addition to processing communication signals, DSP 58 provides control of receiver 50 and transmitter 52. For example, gains applied to communication signals in receiver 50 and transmitter 52 may be adaptively controlled through automatic gain control algorithms implemented in DSP 58.

In a data communication mode a received signal, such as a text message or web page download, is processed by the communication subsystem 34 and is provided as an input to microprocessor 30. The received signal is then further processed by microprocessor 30 which can then generate an output to display 14 or to an auxiliary I/O port 38. A user may also compose data items, such as e-mail messages, using keys 24, trackball 20, or a thumbwheel (not shown), and/or some other auxiliary I/O device connected to port 38, such as a keypad, a rocker key, a separate thumbwheel or some other input device. The composed data items may then be transmitted over communication network 68 via communication subsystem 34.

In a voice communication mode, overall operation of device 10 is substantially similar to the data communication mode, except that received signals are output to speaker 16, and signals for transmission are generated by microphone 28. Alternative voice or audio I/O subsystems, such as a voice message recording subsystem, may also be implemented on device 10.

Short-range communication subsystem 36 enables communication between device 10 and other proximate systems or devices, which need not necessarily be similar devices. For example, the short-range communication subsystem may include an infrared device and associated circuits and components, or a Bluetooth (trade-mark) communication module to provide for communication with similarly-enabled systems and devices.

Powering electronics of the mobile handheld communication device is power source 62 (shown in FIG. 2 as "battery"). Power source 62 may include one or more batteries. Power source 62 may be a single battery pack, especially a rechargeable battery pack. A power switch (not shown) provides an "on/off" switch for device 10. Upon activation of the power switch an application 48 is initiated to turn on device 10. Upon deactivation of the power switch, an application 48 is initiated to turn off device 10. Power to device 10 may also be controlled by other devices and by internal software applications. Additional supplementary power may be provided by additional circuits (which may be referred to as modules) and components in device 10.

Device 10 is provided with tactile elements 70 which works with touchpad 24B to provide a tactile feedback sense as a user of device 10 is activation a region on touchpad 24B. Further detail on tactile elements 70 is provided below.

Touchpad 24B is an input device, which may be provided in portable electronic devices. Touchpad 24B provides a surface on which a user is meant to glide his finger, in order to provide input signals to move a cursor generated on a graphical user interface (GUI). Touchpad 24B has a series of sensors located underneath the surface to sense a capacitance of the finger or capacitance between sensors.

Figure 3:
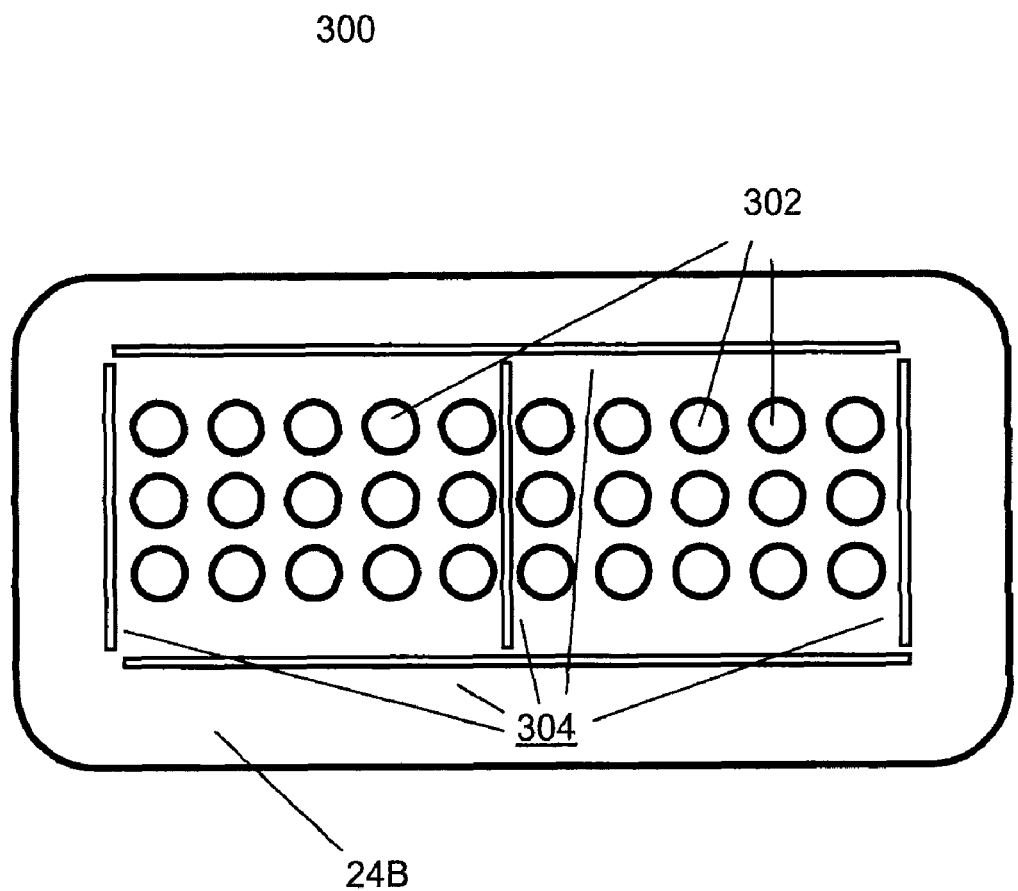
FIG. 3 is a top profile view of an embodiment of a portion of the input device of FIG. 2.

Touchpad 24B may be implement in one or more of several circuits. One circuit provides a series of conductors in a grid where a series of row conductors are separated from a series of column conductors by an insulator layer. A high frequency electrical signal is applied sequentially between pairs in the grid, and the current that passes between the nodes is proportional to the capacitance. A user's finger provides a ground at points in the grid, resulting in a change in capacitance at that location. Alternatively, a capacitive shunt circuit may be provided to sense change in capacitance between a transmitter and receiver that are on opposite sides of the sensor. When a finger is placed between the transmitter and receiver, a ground is created which decreases the local capacitance, which can be detected as a position in touchpad 24B (FIG. 3). The touchpad surface may need to be contacted directly by an interfering body that will disrupt a sensing field in the touchpad circuitry. As such, using an insulated finger (e.g. a gloved finger) or a pencil to contact the surface of the touchpad 24B may not cause a registration of a signal in the circuitry. Another technology may use a series of conductive and resistive layers with a circuit provided within the layers. To register a sense on such a region of touchpad 24B, sufficiently pushing on the surface of touchpad 24 actuates the conductive and resistive layers. In other embodiments, a combination of resistive and capacitive senses may be provided. In other embodiments, touchpad 24B may have certain regions having one or more capacitive sense sections and one or more resistive sense sections. Each of the regions on touchpad 24 may be considered to be the first of two regions when analyzing user actions for an embodiment. A number of physical features 70 may be affixed to the surface of touchpad 24B at strategic locations on touchpad 24B. Each of the tactile elements may be considered to be the second of two regions for analyzing user actions. An input signal generator 74 may be provided with the touchpad 24B to control aspects of the input signals provided to touchpad 24B and amplify, modify, filter and/or process the raw signals generated from touchpad 24B into one or more signals that can be used by other modules or components in device 10. The term "controller" may be used as an equivalent term to "input signal generator". Input signal generator 74 may be incorporated in whole or in part into touchpad 24B.

It will be appreciated that many circuit topologies may be provided for input signal generator 74. For an x, y coordinate touchpad 24B having a series of sensors, the sensors may be connected input signal generator 74, where the generator controls the output signals for use in other components in the device. Generator 74 may be embodied in an application specific integrated circuit (ASIC) or a programmable system on a chip (pSOC), such as those provided by Capsense (trade-mark) products provided by Cypress Semiconductor Corp. An embedded micro-controller may be provided with the controller to convert output capacitive signals to corresponding digital values that may be used by other components in the device. The connection between the controller and the other components may include an interrupt line and a serial interface (for example, SPI, I2C, etc.) which would send the co-ordinate and finger detection signals to the device. The amount of signals generated over a given time may be monitored to provide an indication of the speed of finger travel across the touchpad.

Display 14 has backlight system 64 to assist in the viewing of display 14, especially under low-light conditions. A backlight system is typically present in a LCD. A typical backlight system comprises a lighting source, such as a series of LEDs or a lamp located behind the LCD panel of the display and a controller to control activation of the lighting source. The lamp may be fluorescent, incandescent, electroluminescent or any other suitable light source known to a person of skill in the art. As the lighting sources are illuminated, their light shines through the LCD panel providing backlight to the display.

The intensity of the backlight level may be controlled by the controller by selectively activating a selected number of lighting sources (e.g. one, several or all LEDs) or by selectively controlling the activation duty cycle of the activated lighting sources (e.g. a duty cycle anywhere between 0% to 100% may be used).

To assist with one method of adjusting the backlight level, light sensor 66 is provided on device 10. Sensor 66 is a light sensitive device which converts detected light levels into an electrical signal, such as a voltage or a current. It may be located anywhere on device 10, having considerations for aesthetics and operation characteristics of sensor 66. In one embodiment, an opening for light to be received by sensor 66 is located on the front cover of the housing of device 10 to reduce the possibility of blockage of the opening. In other embodiments, multiple sensors 66 may be provided and the software may provide different emphasis on signals provided from different sensors 66. The signal(s) provided by sensor(s) 66 can be used by a circuit in device 10 to determine when device 10 is in a well-lit, dimly lit or moderately-lit environment. This information can then be used to control backlight levels for display 14. It will be appreciated that a number of discrete ambient lighting levels may be recognized by sensor (s) 66. Progressions between levels may or may not be separated by a constant change in lighting intensity. In some embodiments, LED indicator 18 may be also used as a light sensor.

Now, brief descriptions are provided on the applications 48 stored and executed in device 10. Voice communication module 48A and data communication module 48B have been mentioned previously. Voice communication module 48A handles voice-based communication such as telephone communication, and data communication module 48B handles data-based communication such as e-mail. In some embodiments, one or more communication processing functions may be shared between modules 48A and 48B. Additional applications include calendar 48C which tracks appointments and other status matters relating to the user and device 10. Calendar 48C is activated by activation of calendar icon 26A on display 14. It provides a daily/weekly/month electronic schedule of appointments, meetings and events entered by the user. Calendar 48C tracks time and day data for device 10 using microprocessor 30 and internal clock 46. The schedule contains data relating to the current accessibility of the user. For example it can indicate when the user is busy, not busy, available or not available. In use, calendar 48C generates input screens on display 14 prompting the user to input scheduled events. Alternatively, notification for scheduled events could be received via an encoded signal in a received communication, such as an e-mail, SMS message or voicemail message. Once the data relating to the event is entered, calendar 48C stores processes information relating to the event; generates data relating to the event; and stores the data in memory in device 10.

Address book 48D enables device 10 to store contact information for persons and organizations. Address book 48D is activated by activation of address book icon 26D on display 14. Names, addresses, telephone numbers, e-mail addresses, cellphone numbers and other contact information is stored. The data can be entered through keys 24A and touchpad 24B and is stored in an accessible database in non-volatile memory, such as persistent memory storage 74 or flash memory 42, which are associated with microprocessor 30, or any other electronic storage provided in device 10. Persistent memory 74 may be a separate memory system to flash memory 42 and may be incorporated into a device, such as in microprocessor 30. Additionally or alternatively, memory 74 may be removable from device 10 (e.g. such as a SD memory card), whereas flash memory 42 may be permanently connected to device 10.

Email application 48E provides modules to allow user of device 10 to generate email messages on device 10 and send them to their addressees. Application 48E also provides a GUI which provides a historical list of emails received, drafted, saved and sent. Text for emails can be entered. Email application 48E is activated by activation of email icon 26C on display 14.

Calculator application 48F provides modules to allow user of device 10 to create and process arithmetic calculations and display the results through a GUI.

Input signal processing application 48G operates in conjunction with touchpad 24B input signal generator 74 and physical elements 70 to adjust activation sensitivities and thresholds of touchpad 24B and/or output signals of input signal generator 74. Input signal processing application 48G may have one or more algorithms in a library that it can access to set, change or analyze user actions and signals received from touchpad 24B or input signal generator 74 depending on any number of local operating conditions (for example, specific conductive signatures and/or characteristics of one or more user's fingers on touchpad 24B, sensitivities, specific characteristics for a given world location, having regard to local atmospheric conditions and/or altitudes etc.). Sensitivities ranges may be established, for example high, medium, low with relative sensitivities set accordingly.

Key control application 48H provides a series of templates to allow one or more of defined keys in touchpad 24B to have different assignments depending on a context of the operating environment of device 10. For example, one layout for keys in touchpad 24B is a standard QWERTY keyboard layout. One variant of a QWERTY layout is to present a layout of keys in lower case, as "qwerty" characters. An alternative QWERTY layout is to present a layout of keys in uppercase, as "QWERTY" characters. Other layouts include a layout for numeric keys or a layout for non-English language character sets (e.g. Japanese, French, Korean, Danish, and others).

Backlight system 64 may assist with viewing elements in display 14 in low light conditions.

Database 72 is provided to store data and records for applications 48 and other modules and processes. Database 72 may be provided in flash memory 42 or in another data storage element.

With some aspects of device 10 described above, further detail is now provided on notable aspects of an embodiment. In particular, an embodiment provides a system and method for providing tactile feedback to a user as the user provides a user action to an input device in device 10. In an embodiment the input device may be touchpad 24B.

Touchpad 24B may have one or more input regions covered by a surface. When a user glides his finger over an input region, an input signal may be generated by touchpad 24B and/or input signal generator 74. An embodiment provides a physical feature associated with an input region on the surface of the input device. The physical feature provides a tactile feedback to a user of the input device distinguishing the input first region in the surface from other regions on the surface of the input device. In one embodiment the physical feature is mounted or built into touchpad 24B. The feature may be a raised bump, ridge, platform, cover, depression, dimple etc. The feature may be a change in the texture of the surface of touchpad 24B such as a crosshatch of fibres or the like, on touchpad 24B. The feature may be incorporated as part of a raised section and/or a well or depression in the surface of touchpad 24B. The feature may be built on top of sensors in the touchpad circuit and/or may be placed underneath a substrate of touchpad 24B. The feature may be electrically neutral in resistance and/or capacitance to the user action. Alternatively the user action on the feature may generate a specific electrical signal from a circuit associated with the touchpad 24B.

The physical feature, in one embodiment, provides a tactile feedback to the user when touchpad 24B is being scanned by his finger (or other part of his person). If the physical feature alone is contacted by the user's finger, touchpad 24B may not register a signal, or may register one type of signal. There may be a preset mapping of feedback senses relating to the detected user action. If the first type of signal is registered for an input device, then in the mapping, it may be assumed that a user's finger is hovering about the input device. As such, the user would recognize the feedback generated, and know that his finger is currently positioned about a specific key in touchpad 24B. If he wishes to activate that key, he would depress that area of touchpad 24B further to initiate an "activate" signal for that key in touchpad 24B. As the user's finger presses further on the feature, a part of his finger will eventually contact touchpad 24B. At that instance, the contact is detected by touchpad 24B (either through a second level of signal that is distinguished from the above signal or a different signal). Also, as a user glides a finger across the surface of touchpad 24B, it will run into the feature and run over it. There may or may not be a disruption in the signals (or progression of signals) generated by touchpad 24B and/or input signal generator 74 as this glide occurs. The gliding of the finger over the features on touchpad 24B may be a separate user action. There may be one or more time boundaries defined for the gliding action. For example, the entire glide may be required to cover a certain area on touchpad 24B within a predefined time limit (e.g. less than any of 30, 20, 10, 5, 2, or 1 second). Additionally or alternatively, the traversal of the feature may be required to be completed within another predefined time limit (e.g. less than any of 3, 2, 1, 0.5, 0.25, or 0.1 second). Such data may be processed by input signal processing application 48G to make a determination when a when a gliding action does or does not match an predetermined input signature for a predetermined user action that requires further activity by device 10.

The input signal generator 74 (and/or input signal processing application 48G) may process the signals to address noise, temperature, humidity, electrostatic discharge (ESD) compensation, and other operating parameters relevant to touchpad sensing technologies and hysteresis for detection between the different input regions. As previously noted, a finger resting/moving on touchpad 24B would have a higher capacitance value, then as it approaches the feature, one would see a drop in value (as the feature is mounted and the air gap is created between the feature and the surface of the touchpad). Next, when the finger is on top of the feature and the user begins pressing down on it, the capacitance value would increase again as the user pushes on it. For example with an exemplary Synaptics clearpad (trade-mark), the Z (coverage value) may generate an output value of about 50 units. In such an arrangement, any reading above about 25 units would be designated to be a finger contact on touchpad 24B; any reading about below 25 units would indicate that a finger is in proximity of the touchpad surface, but not actually touching it. For example, as a finger moves along the touchpad surface, the readings would about 25 units or more and would drop below about 25 units as the finger goes on top of the nodule. When the finger pushes on the nodule, the readings may increase, for example to a value of about 40 units. These values have been observed to be generated from an ASIC of Synaptics touchpad—a conversion value may be ascertained to provide corresponding values in capacitance, inductance, resistance and/or reluctance. Generally, it has been observed that a weaker (namely smaller) capacitance reading is generated when a finger presses over the nodule as opposed to a finger pressing on a surface of the touchpad, as when the finger is pressing on the nodule, there is only have partial contact of the finger with the touchpad. From monitoring the coordinates of the input signals, the embodiment can also determine the co-ordinates of the finger travel on touchpad 24B and determine when a finger has "stopped" at a location thereon. At that time, the input signal processing application 48G may be placed in a mode to expect or wait for a finger to depress at the stopped location, indicating to register a finger for a given feature and/or function launch.

With this tactile feedback, a user may scan his finger across touchpad 24B without having to necessarily look at touchpad 24B to determine what keys are being scanned. The user, through learning, may associate specific features with specific keys. Once he feels a target key in touchpad 24B, he can stop scanning and then press harder on the feature to activate it.

Now, further detail is provided on an exemplary input device according to an embodiment. Referring to FIG. 3, a portion of touchpad 24B is shown at 300. Keys in touchpad 24B may be demarked by features, shown as nodules 302. Nodules 302 may comprise, in total, tactile elements 70 (FIG. 2). The outlines may be silk screened on the surface of touchpad 24B. As touchpad 24B provides a surface having a number of first input regions, an embodiment provides a mapping of regions associated with keys in touchpad 24B with expected signals generated by touchpad 24B when such areas are "touched". Such signals may be processed by tactile adjustment module 48G. Keys in touchpad 24B may be partitioned in groups, and as such, physical barriers, ridges or separations may be provided incorporated into ridges 304 that are provided within and/or outside the display region in touchpad 24B and/or are located above or underneath nodules 302. Ridges 304 may be used to define any areas of interest in touchpad 24B, such as boundaries for one or more keys in touchpad 24B. Ridges 304 may extend upwardly from the surface of touchpad 24B and may define a boundary that provides protection of touchpad 24B from being marked up from things striking it. There may be one or more nodules 302 associated with a given region in touchpad 24B. Each of the nodules may be a second of two regions used to analyze user actions. When there is a plurality of nodules 302 associated with such a given region, each of the nodules 302 may be of the same size, structure and composition or two or more of such nodules may have different sizes, structures and compositions. In one embodiment, one or more nodules 302 may be formed from a clear non-conductive material, such as polycarbonate plastic. It may have an optimum dielectric. The physical form of such nodules 302 may be that they are at least partially collapsible, wherein they have at least a slight elastic property. Nodule 302 may be formed with a slight well in its upper surface, such that when nodule 302 is depressed, it becomes flush (or is compressed or moved towards) to the surface of the touchpad. Use of a non-conductive material in the feature may assist in the sensing of a finger thereon in a capacitive touchpad. Depending on the composition of the overlay on touchpad 24B (or the presence of an overlay), the thickness of the printed circuit board, dielectrics etc., the capacitance values for a finger being pressed or scanned across the touchpad 24B may vary considerably. However, typically, the capacitance value is value, e.g. in the neighborhood of any of the following ranges: about 100 pF or less;

about 50 pF or less; and about 10 pF or less. Typically calibration and sensitivity tuning must be done once a touchpad 24B is constructed to determine an operating range of signal levels as the fingers are scanned and as pressure is applied to the touchpad 24B. Such measurements may be determined for a particular touchpad and used to discern and distinguish from input signals generated by the touchpad.

Touchpad 24B may have an indium titanium oxide (ITO) layout providing a piezoelectric sensing system for sensing when a user is touching the touchpad. Such an implementation utilizes a capacitive-sensing based circuit. The layout may be implemented in a multiple layer pad, see for example Clearpad (trademark) products from Synaptics Inc. Additionally or alternatively a single layer of buttons may be provided. One system utilizing buttons has the electrode surface of the touchpad extending out slightly beyond nodules 302. In this context, a button is a single element or region of elements that is defined to have a single function attributed to it. For example, a button may be one or more keys in a numeric keypad, which are used to distinguish the numeric keypad from neighbouring keys in the keypad (such as alphabetic keys or directional keys etc.).

Additional data and signal processing may be provided for feedback signals provided by the touchpad when a finger is place on nodules 302. For example, for a dual layer high resolution pad, centroid calculations and algorithms may be provided to identify a notional center region of the contact area of a footprint of one or more fingertips. For example, a footprint may be provided for each finger and the thumb of a hand, and for different sizes of hands (e.g. a fingers on child's hand, fingers on an adolescent's hand, fingers of an average adult male or female, finger's of a large adult male's hand, a hand with thin fingers, a hand with thick fingers, etc.) and for different pressures being applied for a given size of hand (e.g. light pressure, medium pressure and firm pressure, etc.). The footprint mapping may be used to identify and modify characteristics and sizes of the first and second regions used to evaluate user actions. Also a sensitivity factor may be provided relating to the amount of pressure that needs to be applied by a finger to a nodule 302 before it is registered as legitimate signal for further processing. For example, sensitivity may be set to a high level so that full contact is not required to register a finger. This may be useful in accommodating for persons having hands or fingers with calluses and/or insufficient fleshy skin to envelop around the physical feature of the nodule 302 and contact the touchpad. Such processing may be performed by tactile adjustment application 48G with or without calculations conducted on DSP 58.

Touchpad 24B may incorporate a display component, such as a cholesteric LCD. A cholesteric LCD is bi-stable and can be programmed to have its display to be set and then the power may be disengaged from touchpad 24B. As such, no power or very little power is required to maintain an image of the key for touchpad 24B. In this configuration, a cholesteric substrate for touchpad 24B provides a pliable surface that may be deflected, thereby allowing it to be depressed when a key in touchpad 24B is pressed.

Figure 4:
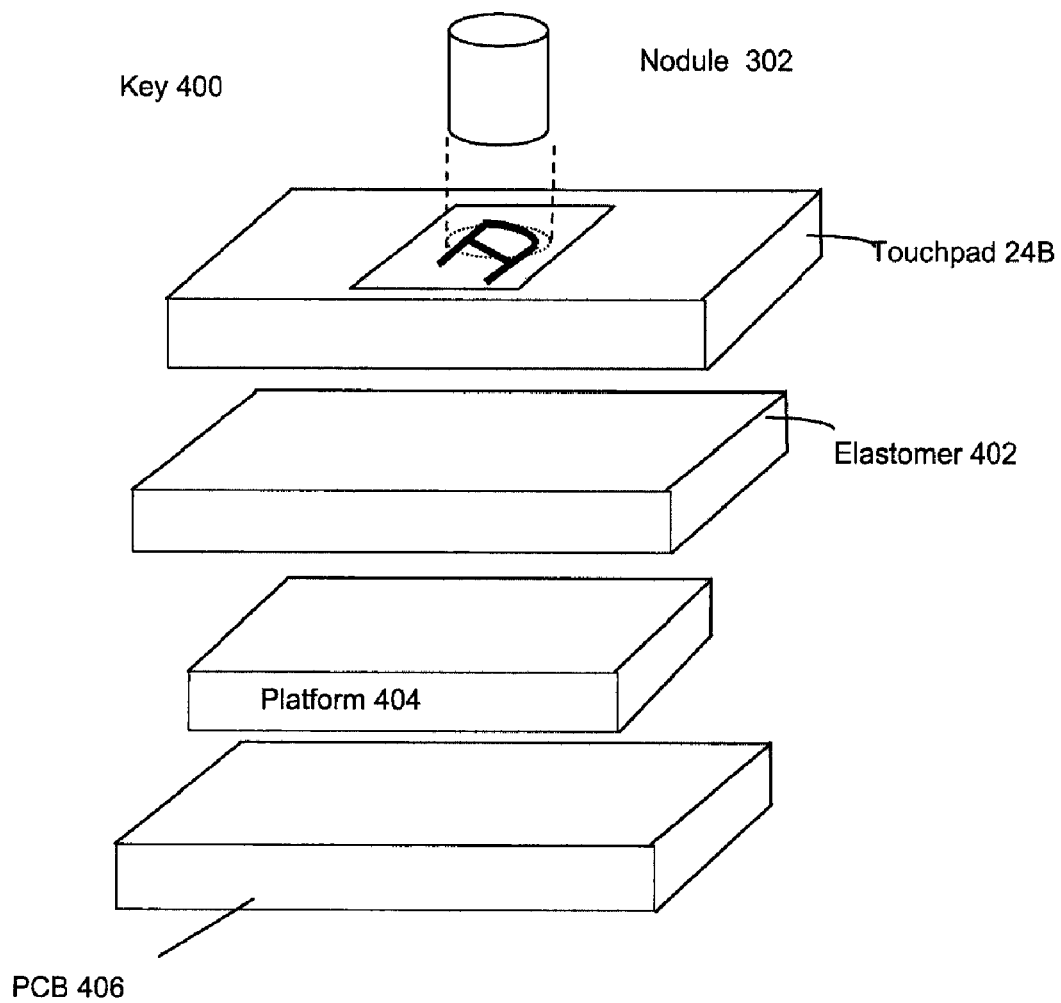
FIG. 4 is a top cross-sectional exploded view of parts of a key in the input device, shown as a touchpad of FIG. 2.

Referring to FIG. 4, an exploded cross-sectional view of components comprising elements underneath a region defining a key in touchpad 24B is shown. It will be appreciated that the embodiment may be for a single key, a group of keys or all keys in touchpad 24B. This key can be associated with a first input region for touchpad 24B. As noted before touchpad 24B has capacitive circuits which allow it to detect when an external finger (or other body part) is touching its surface. As such, the output signals can be analyzed to determine when a region defining a key is activated on touchpad 24B. Additional regions may be defined for additional keys in touchpad 24B. In an embodiment, key 400 is shown. For a given key 400, touchpad 24B has circuitry to detect a change in capacitance (and/or resistance) when a user's finger touches the surface of touchpad 24B.

From FIG. 3, one physical feature relating to tactile elements 70 as described above in one embodiment is provided as nodule 302 which is mounted on top of the surface of touchpad 24B. Nodule 302 may be glued or welded thereon. It may also be integrally formed with touchpad 24B. The nodule itself provides in one embodiment a second input region that is used to provide tactile feedback to a user when a user action is to touch the region. The second region may be located in a part of nodule 302. Nodule 302 may comprise a polycarbonate material or the like. It may be clear, tinted or opaque. The size, dimensions, texture and shape of nodule 302 may vary according to specific design requirements. The shape of nodule 302 may be rectanguloid, cylindrical, spherical, conical or any combination of or variation on those shapes. An exemplary cross sectional dimension contacting the surface of touchpad 24B for nodule 302 may be in the range of about up to 30 mm, 20 mm or 10 mm. An exemplary height of nodule 302 may be any of up to about 15 mm, 10 mm, 5 mm or 3 mm. These dimensions and shapes are not meant to be limiting to other embodiments.

The surface area of nodule 302 when viewed from above (herein referred to as the overhead surface area) may have dimensions and a shape such that the end of a user's finger (such as a child's pinky finger) is larger in cross-sectional area than the overhead surface area of nodule 302. Generally, one functional requirement is that the size and shape be sufficiently large to be felt by a user as he scans about or on the surface of touchpad 24B in order to provide a tactile sense that the particular key is being hovered over by the user's finger. As nodule 302 should be sufficiently small, such that if the user has his finger on nodule 302 and decides that he wishes to activate the key associated with nodule 302, then as the user depresses his finger onto nodule 302, the tip of the finger can deform around nodule 302 such that a part of the tip of the finger will contact the surface of touchpad 24B, thereby allowing the contact of the surface to register as an activation signal on touchpad 24B for the key associated with nodule 302.

Underneath touchpad 24B and within the housing of device 10 (not shown) elastomer 402 is provided. Elastomer 402 is a resilient material that provides some physical cushioning for touchpad 24 B. Elastomer 402 may or may not be provided in other embodiments. Supporting elastomer 402 is platform 404 which is simply a physical structure to allow elastomer 402 to be located underneath and in close proximity to the bottom of touchpad 24B. As shown, platform 404 is situated above printed circuit board (PCB) 406. Platform 404 may be affixed to PCB 406. The dimensions and shapes of elastomer 402 and platform 404 depend on the dimensions of the housing for device 10 and the location of touchpad 24B in device 10.

It will be appreciated that other embodiments may be provided where a transducer is located in device 10 to provide a feedback signal upon detection of a "key" being activated on touchpad 24B. In other embodiments, a key assembly may be provided having one or more additional electromechanical switching mechanisms to provide additional feedback signal(s) when the key region in touchpad 24B is pressed (or not pressed). Further still, a key with a transducer may be provided in a section of device 10 that is separated from display 14 and touchpad 24B.

Figure 5A:
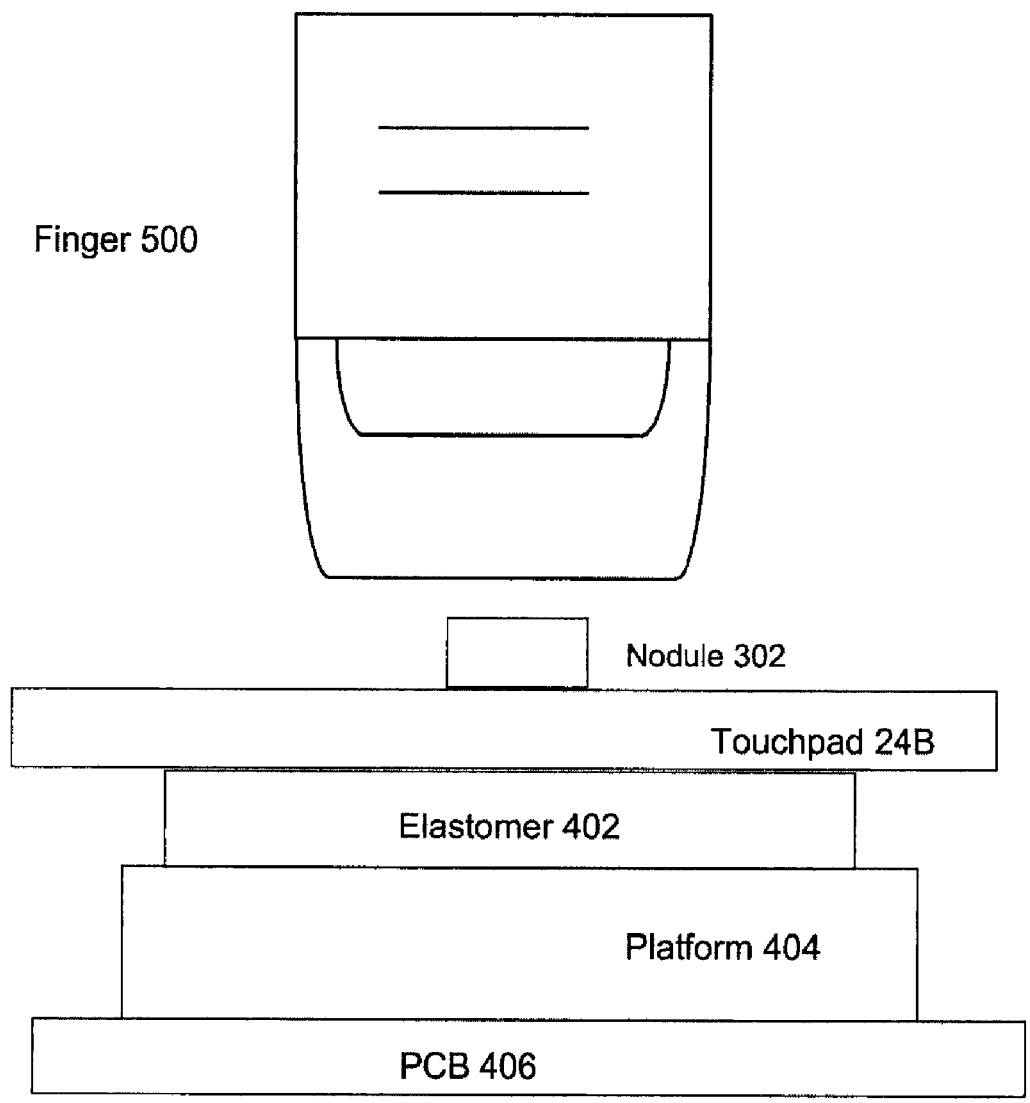
FIG. 5A is a side cross-sectional view of the key in the touchpad with a user's finger above the key of FIG. 4.

In FIG. 5A, nodule 302 is shown as fitting over a region in touchpad 24B that has been designated as a key. Nodule 302 is shown as a separate component for a specific key. In other embodiments, a connected or continuous substrate in which nodule 302 is an element may be provided that is laid over touchpad 24B and a region of key in touchpad 24B. In such a substrate, individual keys may be connected to each other by a web or other material. Such a web may be thinner in thickness than nodule 302 and/or may be made from a (more) flexible material, in order to isolate movement of nodule 302 from adjacent nodules 302.

Figure 5B:
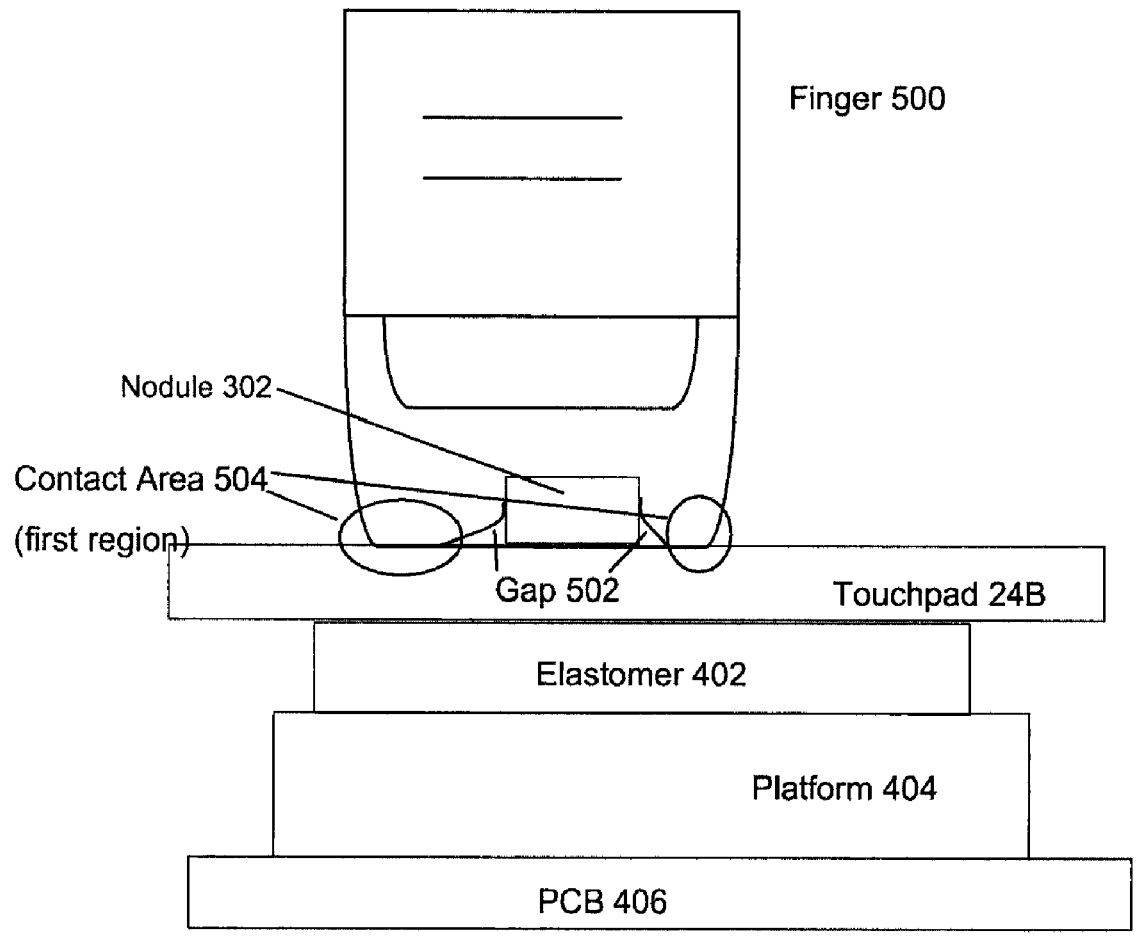
FIG. 5B is a side cross-sectional view of the key in the touchpad of FIG. 4 with a user's finger touching the key and the touchpad.

Referring to FIG. 5B, further detail is provided on activation of a key region associated with touchpad 24B and nodule 302. When finger 500 touches only nodule 302 (action not shown) a first feedback is provided, namely the feeling by the user of the nodule 302 alone. As finger 500 presses further downward on nodule 302, the tip of finger 302 deforms around and about nodule 302, such that at least one portion of the tip of finger 500 makes contact with the surface of touchpad 24B, as shown as contact area 504. As such for the user action, the second region on the physical feature is being contacted simultaneously with the first feature, that being the surface of touchpad 24B. This may provide a second feedback felt by the user, namely the simultaneous touching of nodule 302 and contact area 504. There may be an air gap 502 defined by the location of contact area 504, the edge of gap 502 defined by the location and size of contact area 504 on the first region, the edge of nodule 302 and finger 500. There may be more than one contact area and there may be more than one air gap. When finger 500 is on top of nodule 302 and the user begins pressing down on it, the air gap(s) may decrease in (total) size as the finger compresses around the feature and makes more contact with the surface of touchpad 24B. As such, the capacitance value may increase as the user pushes on nodule 302.

An air gap may affect the magnitude of the signal generated by the input signal generator. The signal may be affected by the combination of one or more of a size of the air gap, an area of first input region on the surface of touchpad 24B contacted during the user action and an area of the second input region on nodule 502 contacted by during the user action.

Depending on the sensing technologies used, nodule 302 may be formed with a view to minimize or maximize the size and/or number of air gaps 502 provided. When a sensing circuit has decreased sensitivity to a finger on nodule 302 because of an air gap 502, the size and number of air gaps may be reduced. Generally, touchpad 24B may deflect downwards by pressure applied by finger 500, but the deflection is not significant. Elastomer 402, platform 404 and PCB 406 support touchpad 24B to resist pressure applied to touchpad 24B. The circuitry in touchpad 24B and input signal generator 74 are configured to be sensitive to recognize one or more signals caused by the user's finger making contact with one or more regions around nodule 302, such as contact area 504. Touchpad 24B and input signal generator 74 may generate a signal when finger 500 makes contact with only nodule 302. However, this signal in one embodiment is set to be distinguished from actual contact signals made around nodule 302. Once the activation signals on touchpad 24B are processed, they may be filtered and processed with any other signals detected on touchpad 24B in order to identify which key region in touchpad 24B has been activated.

As such nodule 302 and touchpad 24B combine to provide a tactile feedback (sense) to the tip of the finger of the user as he is initially contacts only through top of nodule 302 and an activation signal generated by touchpad 24B once finger 500 contacts the surface of touchpad 24B and the resulting signals generated by touchpad 24B are processed.

Figure 6:
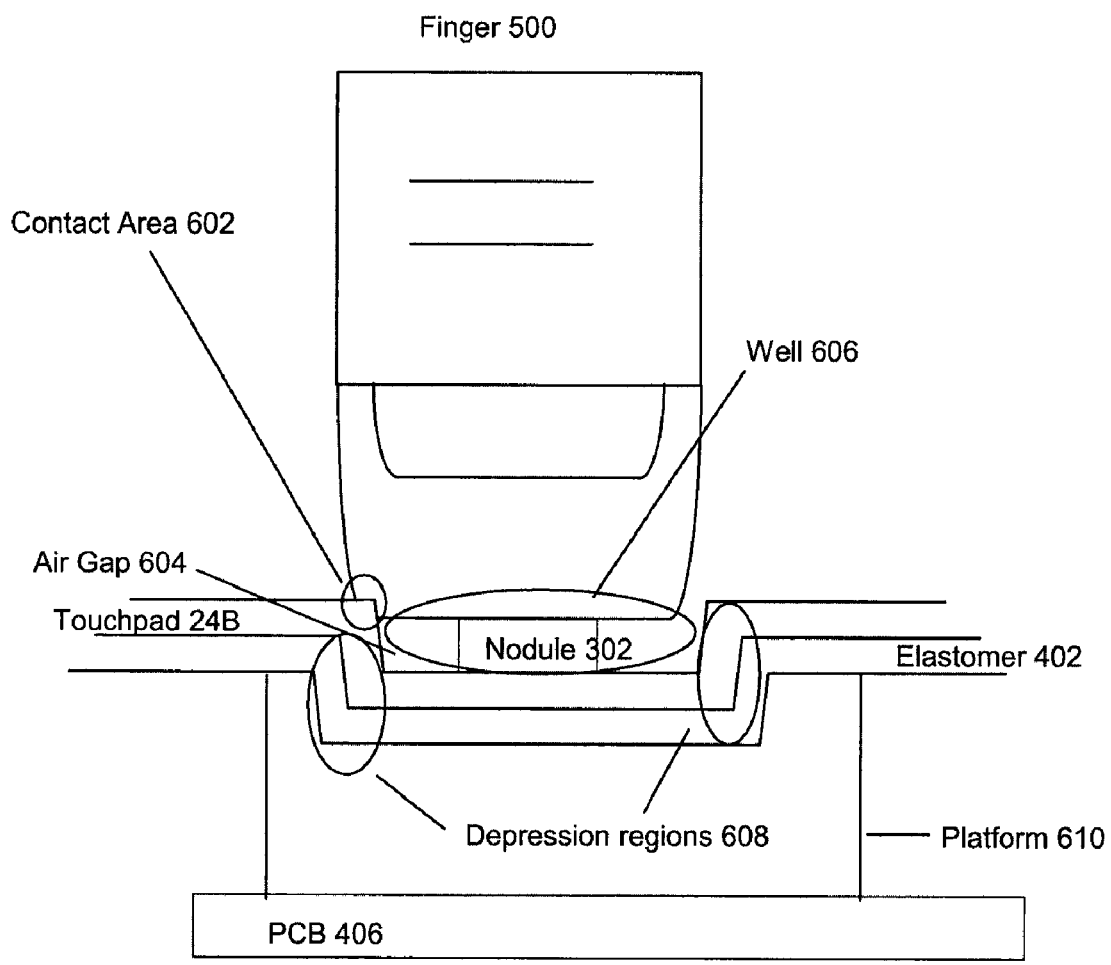
FIG. 6 is a side cross-sectional view of another embodiment of the input device of FIG. 2 shown as a touchpad with a user's finger touching a key and the touchpad.

Referring to FIG. 6, another embodiment is shown where key 600 is shown in touchpad 24B. Touchpad 24B is shaped to have well 606 depressed in its surface. Depression regions 608 define the exterior walls of well 606. Within well 606, in its bottom, nodule 302 is located. As with key 400 (FIG. 4), the dimensions and shapes of both well 606 and nodule 302 are provided to allow finger 500 to, at a first instance, touch only nodule 302, and at a second instance, touch at least one part of the surface of touchpad 24B, such as at contact area(s) 602. For example, the top cross-sectional area of well 606 may be square, rectangular, oval, or any combination thereof. The depth of well 606 may be approximately up to 10 mm or more, with the nodule 302 made to be of an appropriate dimension to still allow a user to feel it when his finger scans touchpad 24B. Nodule 302 may be positioned such that its top extends above the top level plane of well 606. Alternatively, its top may be below the surface. Platform 610 may be shaped to receive well 606. Again, air gap(s) 604 may be produced when contact is made. Similar signal analysis of signals generated by touchpad 24B as mentioned before is conducted as finger 500 touches nodule 302 and touchpad 24B.

Figure 7:
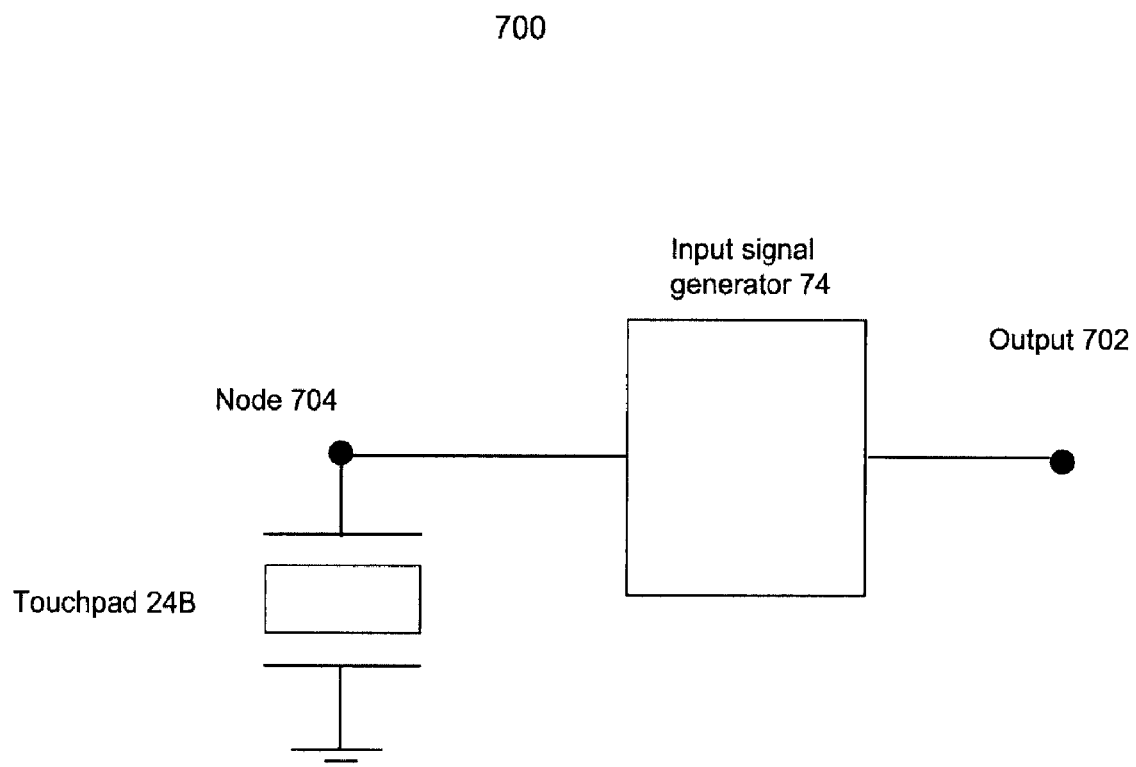
FIG. 7 is an exemplary sensing circuit provided for the input device of FIG. 2.

Further detail is now provided on an exemplary circuit provided to detect feedback mechanism provided by an embodiment. Referring to FIG. 7, circuit 700 generates one or more input signals for use by other components, devices and modules in device 10. Circuit 700 may be provided for one or more pairs of terminals for one or more input devices in device 10. As an example, circuit 700 may be tailored to generate input signals responsive to user actions imparted on one or more input regions on touchpad 24B.

Touchpad 24B is shown in circuit 700 as a transducer. A transducer may be in a resting state, where it is not activated and an activated state, where it vibrates at a particular frequency and amplitude. It may also be set to be in a stressed state, where it is being stressed from physical force applied to it, such as a user action.

The transducer may contain piezoelectric material(s) or crystals which are used to generate a voltage in response to the force. In a piezoelectric crystal, internal positive and negative electrical charges are separated, but symmetrically distributed throughout the crystal, so that the crystal has an overall electrically neutral charge. When a mechanical stress is applied to the crystal, the charge symmetry is disturbed, and the resulting asymmetry in the charge in the crystal generates a voltage across the crystal. The generated voltage may be very high. For example, a voltage exceeding 12,000 V (at a low current) may be created in a 1 cm cube of quartz when a 2 kN (k Newtons) force is applied to it.

As noted above, a piezoelectric element generates voltages when it is stressed. When a piezoelectric element is used as a sensor and when it is stressed, a voltage is generated which can be used as a signal indicating sensing of a user action on an input region defined by an embodiment. The voltage may be quite high. A circuit is provided to receive the voltage generated by the piezoelectric element and provide it to an appropriate circuit to charge or power other elements in device 10. To harness the voltage, the generated voltage may be provided to a rectifier circuit to convert the voltage to a DC value, which may then be stored and used by other circuits.

Different electrical/deformation effects can be exhibited by a piezoelectric crystal, depending on how it is cut, including transverse, longitudinal, and shear effects. In a transverse effect, when a force is applied along a neutral axis of the crystal, the piezoelectric material generates an electrical voltage in a perpendicular direction to the force. In both longitudinal and shear effects, the amount of voltage produced is proportional only to the applied force as applied and the direction of the force does not affect the voltage.

Exemplary piezoelectric materials include crystals, ceramics and polymers. Man-made piezoelectric ceramics include: barium titanate ($BaTiO_3$), lead titanate ($PbTiO_3$), lead zirconate titanate (typically referred to by the acronym "PZT"), potassium niobate ($KNbO_3$), lithium niobate ($LiNbO_3$), lithium tantalate ($LiTaO_3$), sodium tungstate ($Na_xWO_3$), polyvinylidene fluoride (PVDF) and P(VDF-TrFE) which is a co-polymer of PVDF. An optically transparent piezoelectric polymer may also be used, which is sometimes referred to as an electro active polymer (EAP). Some optically transparent piezoelectric polymers include: lanthanum-modified lead zirconate titanate (PLZT) and lead magnesium niobate-lead titanate (PMN-PT).

Electrically, a piezoelectric transducer has very high direct current (DC) output impedance and may be represented schematically in a circuit diagram as a capacitor or as a proportional voltage source and filter network. A voltage at the source is directly proportional to the applied force, pressure or strain.

A piezoelectric transducer may be provided in many forms, depending on how it will be used. As a unimorph form, a single piezoelectric element is provided, typically comprising of a ceramic material. As a bimorph form, a center substrate has a first piezoelectric elements provided on one face of the substrate and a second piezoelectric element provided on the opposite face of the substrate. One piezoelectric element would be configured to operate as an actuator and the other would be configured to operate as a sensor. In another form, a piezoelectric transducer may be provide in a (ductile) fibre form, which may be made from spinning and drawing a fibre of piezoelectric crystal material from a larger shaped block through a viscous suspension spinning process (VSSP) known in the art. Such fibres typically have a diameter of between about 10 microns to 250 microns or more. The generated voltage may be a highly damped alternating AC voltage. For fibres, voltages in the range of 300 Vac (peak to peak) have been measured in response to an initial activation force. One or more sets of positive and negative electrode pairs may be provided on the transducer to pick up voltage signals when the transducer is operating as a sensor.

An output voltage signals generated by touchpad 24B by a user action may be within a range of voltages and may have a range of time durations. An expected user action may have an expected voltage signal signature associated with it. There may be variations on one or more aspects of the signature (e.g. time, duration, location, amplitude, intensity) that would still be considered to match a template for the user action.

Ancillary voltages required to be applied to touchpad 24B at node 704 in order for it to operate as a sensor are not shown.

Input signal generator module 74 may includes a digital signal processing module that analyzes the output from touchpad 24B and then selectively generates the input signals at node 702 when a match to a user action has been detected. It may use DSP 58 provided in device 10. Signal processing algorithms may be provided in tactile adjustment module 48G or other modules. Analog circuits and/or components may also be provided in input signal generator 74 to provide other detection circuits. For example, a series resistor ladder may be provided with a series of taps for different voltage output levels for generator 74. Each tap may represent a different signal for a user action. The signal may be selectively provided to the ladder by other circuits in generator 74. It will be appreciated that other circuits and modules may be provided for input signal generator/

Figure 8:
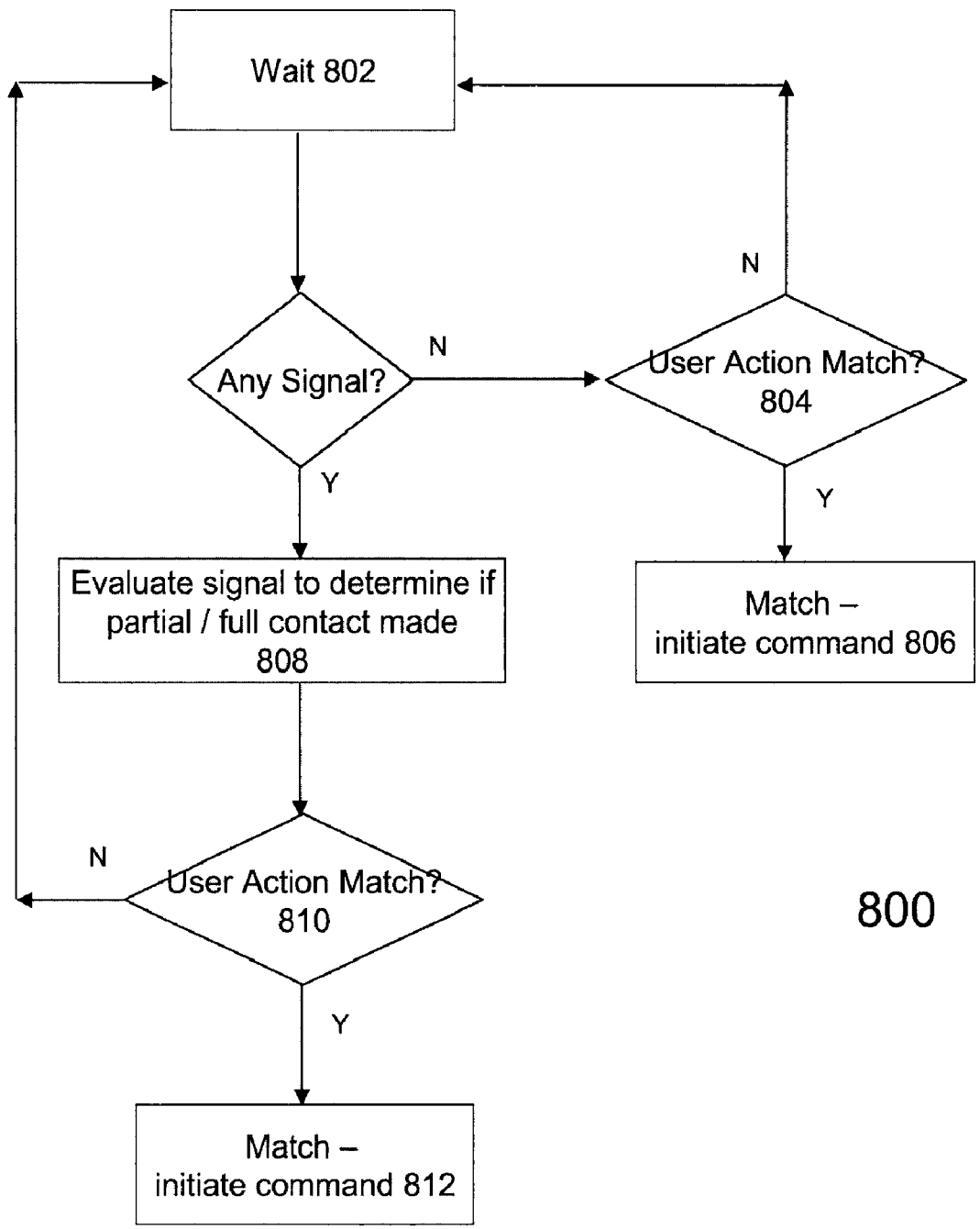
FIG. 8 is an exemplary algorithm utilized to process signals generated by the sensing circuit of FIG. 7.

FIG. 8 provides an exemplary algorithm 800 executed by a combination of signal generator 74 and/or input signal processing application 48G in processing signals generated by a user action, such as a finger scanning across touchpad 24B. First at step 802, the algorithm waits for a signal to be received from a user action. If no signal is received within a time period, then at step 804 the immediately previously received signals are evaluated against known input signal patterns to determine whether an input signal pattern has been detected. If there is a match, then a further action relating to the detected input signal pattern is initiated at step 806. If there is no match, then the algorithm returns to a wait state 802.

From step 802, if a signal is received, this indicates that a finger has contacted the touchpad. As such, it is evaluated to determine what type of contact has been made. At step 808, the signal is evaluated to see if it matches against a predetermined range (e.g. in pressure, capacitance and/or location) for a partial contact (where the finger is contacting both the nodule 302 and the surface of touchpad 24B with a possible air gap inbetween) and/or a predetermined range for a full contact with the surface of touchpad 24B (where the finger is contacting just the surface). It will be appreciated that if a signal is generated when the user is just touching nodule 302, that may be analyzed as well. Time, location, and/or pressure may form part of the datapoints for the input signal.

For detection of either type of contact, at step 810 an evaluation is made of the received signal having regard to at least its location and time value for the signal against one or more previously received signals, to determine if the just received signal completes a match against a predetermined input signal pattern. The comparison may be conducted against a library of "signatures" for a library of input signal patterns. The library may be stored in the memory 74 of device 10.

If there is a match of the input pattern against a library pattern, then an input signal pattern has been detected and an action signal is generated that is associated with that user action at step 812. For example, if the user has selected the "9" key on the keypad, a command is sent to produce a "9" on a display.

If there is a no match, then the algorithm returns to step 802 to wait for the next signal.

It will be appreciated that in steps 810 and 806 a series of input signals may be built to constitute a series of different key activation scenarios, including: a) touching nodule 302 from above then pressing down to touch nodule 302 and the surface of touchpad 24B; b) scanning the surface of touchpad 24B, then touching both the surface of touchpad 24B and nodule 302, then just touching nodule 302, then pressing down on nodule 302 and touching both nodule 302 and the surface of touchpad 24B; c) scanning the surface of touchpad 24B, then touching both the surface of touchpad 24B and nodule 302, then pressing down on nodule 302 and the surface of touchpad 24B, etc. These input signal patterns may be provided with the above noted user actions of simply simultaneously touching two input regions on a touchpad. As such, using exemplary algorithm 800, the previously mentioned first, second and third input signals may be evaluated for their location, time and order to determine whether they match an input signal pattern.

It will be appreciated that other algorithms may be provided where the above noted steps are provided in different order and/or in different processes. The algorithm may be represented by a state diagram.

It will be appreciated that the embodiments relating to devices, modules, applications and systems may be implemented in a combination of electronic hardware, firmware and software. The system may be incorporated into any electronic device, such as a communication device, a portable electronic device, a personal computer, a keyboard, keypad or the like. The firmware and software may be implemented as a series of processes and/or modules that provide the functionalities described herein. Interrupt routines may be used. Data may be stored in volatile and non-volatile devices described herein and be updated by the hardware, firmware and/or software. Some of the processes may be distributed. The physical components providing structural support for the elements described herein (such as the keypad and the underlying internal structural features) may be formed from materials known to those in the art using processes known to those in the art.

As used herein, the wording "and/or" is intended to represent an inclusive-or. That is, "X and/or Y" is intended to mean X or Y or both.

In this disclosure, where a dimension is provided as an approximate value (for example, when the dimension is qualified with the word "about"), a range of values will be understood to be valid for that dimension. For example, for a dimension stated as an approximate value, a range of about 20% larger and 20% smaller than the stated value may be used. Dimensions of features are illustrative of embodiments and are not limiting unless noted.

The present disclosure is defined by the claims appended hereto, with the foregoing description being merely illustrative of an embodiment of the disclosure. Those of ordinary skill may envisage certain modifications to the foregoing embodiments which, although not explicitly discussed herein, do not depart from the scope of the disclosure, as defined by the appended claims.

The invention claimed is:

1. An electronic device comprising:
a touch-sensitive input device;
a tactile element of a surface of the touch-sensitive input device;
a controller coupled to the touch-sensitive input device and configured to generate a first input signal in response to detection of a touch on the tactile element and not on a region of the surface and a second input signal in response to detection of a touch on the tactile element and a region of the surface around the tactile element.

2. The electronic device as claimed in claim 1, wherein the tactile element comprises a raised bump, a ridge, a platform, a cover, a depression, a well, a line, a score mark or a dimple.

3. The electronic device as claimed in claim 1, wherein the tactile element comprises a nodule located on the surface.

4. The electronic device as claimed in claim 1, wherein the surface of the touch-sensitive input device comprises a well and the tactile element comprises a nodule located in the well.

5. The electronic device as claimed in claim 1, wherein the tactile element is located on a raised section of the surface.

6. The electronic device as claimed in claim 1, wherein the tactile element is located underneath a substrate of the touch-sensitive input device.

7. The electronic device as claimed in claim 1, wherein the controller is configured to generate a third input signal in response to detection of an end of the touch on the area of the surface where the tactile element is not located.

8. The electronic device as claimed in claim 1, comprising further tactile elements of the surface.

9. The electronic device as claimed in claim 1, wherein the tactile element is a physical feature.

10. An electronic device comprising:
a touch-sensitive input device;
a tactile element of a surface of the touch-sensitive input device;
a controller coupled to the touch-sensitive input device and configured to generate a first input signal in response to detection of a touch on the tactile element and not on a region of the surface, a second input signal in response to detection of a touch on the tactile element and a region of the surface around the tactile element, and a third input signal in response to detection of an end of the touch on the area of the surface where the tactile element is not located.

11. The electronic device as claimed in claim 10, wherein the tactile element comprises a raised bump, a ridge, a platform, a cover, a depression, a well, a line, a score mark or a dimple.

12. The electronic device as claimed in claim 10, wherein the tactile element comprises a nodule located on the surface.

13. The electronic device as claimed in claim 10, wherein the surface of the touch-sensitive input device comprises a well and the tactile element comprises a nodule located in the well.

14. The electronic device as claimed in claim 10, wherein the tactile element is located on a raised section of the surface.

15. The electronic device as claimed in claim 10, wherein the tactile element is located underneath a substrate of the touch-sensitive input device.

16. The electronic device as claimed in claim 10, comprising further tactile elements of the surface.

17. The electronic device as claimed in claim 10, wherein the tactile element is a physical feature.

* * * * *